(12) United States Patent
Bath et al.

(10) Patent No.: US 6,843,450 B2
(45) Date of Patent: Jan. 18, 2005

(54) METHOD AND APPARATUS FOR ROTATABLY SUPPORTING MOVABLE COMPONENTS, INCLUDING CANARDS

(75) Inventors: David L. Bath, Everett, WA (US); Kelly T. Jones, Snohomish, WA (US); P. Brian McKinney, Marysville, WA (US); Joseph R. Pineda, Mukilteo, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/690,285

(22) Filed: Oct. 20, 2003

(65) Prior Publication Data

US 2004/0079839 A1 Apr. 29, 2004

Related U.S. Application Data

(60) Provisional application No. 60/420,196, filed on Oct. 21, 2002, provisional application No. 60/420,668, filed on Oct. 22, 2002, provisional application No. 60/420,670, filed on Oct. 22, 2002, and provisional application No. 60/420,621, filed on Oct. 22, 2002.

(51) Int. Cl.[7] ............................................... B64C 3/38
(52) U.S. Cl. .................................. 244/131; 244/45 A
(58) Field of Search ........................ 244/48, 87, 45 A, 244/56, 66; 114/332, 169, 152; 384/549, 618, 565, 570, 572

(56) References Cited

U.S. PATENT DOCUMENTS

| | | | | |
|---|---|---|---|---|
| 384,023 A | * | 6/1888 | Corbett .................. | 384/549 |
| 458,317 A | * | 8/1891 | Hawyer .................. | 384/565 |
| 700,201 A | * | 5/1902 | Howe .................... | 384/565 |
| 2,029,717 A | * | 2/1936 | Heinze ................... | 384/549 |
| 2,189,615 A | * | 2/1940 | Rampacher ............. | 384/549 |
| 2,421,694 A | * | 6/1947 | Hawkins ................ | 244/75 R |
| 4,433,878 A | * | 2/1984 | Rosenthal .............. | 384/549 |
| 5,150,858 A | * | 9/1992 | Hopwell et al. ........ | 244/45 A |
| 5,887,986 A | * | 3/1999 | Pouliquen et al. ...... | 384/549 |
| 6,064,923 A | * | 5/2000 | Bilange et al. ......... | 701/3 |
| 6,695,688 B1 | | 2/2004 | Owen et al. | |
| 6,698,688 B1 | * | 3/2004 | Jones ..................... | 244/75 R |

OTHER PUBLICATIONS

Timken, Bearings, Comparing Other Bearing Types (19 pages), Copyright 2002 http://www.timken.com/products/bearings/fundament/compare.asp [Accessed Jun. 26, 2002].
Rockwell International, B–1, AF–1 Test Specimen (1 page).
Flight, F–15, Reed Business Publishing Group, David Hatchard, Sutton 1991 (1 page).
F–15 Diagram (2 pages).
F–18, Fuselage Section—Assembly of Aft Structure (1 page).
F–18, The Boeing Company, Figure 3, Test Fixture (1 page).
F–18, The Boeing Company, Figure 2, Stabilator FT69 Test Article (Ref. E/F End Item Dwg 74T062133) (1 page).
F–18 Diagram (3 pages).
Dryden Flight Research Center EC98 44749–24, Photographed Sep. 1998 (1 page) http://www.dfrc.nasa.gov/Gallery/Photo/TU–144LL/Small/EC98–44749–24.jpg [Accessed Oct. 7, 2003].

(List continued on next page.)

*Primary Examiner*—Galen Barefoot
(74) *Attorney, Agent, or Firm*—Perkins Coie LLP

(57) ABSTRACT

Methods and apparatuses for rotatably supporting movable components, including canards. An apparatus in accordance with one embodiment of the invention includes an airfoil configured positioned external to an aircraft fuselage. A connecting portion can depend from the airfoil portion and can have an attachment portion configured to attach to an aircraft internal to the aircraft fuselage. Rollers carried by one of the connecting portion and the fuselage can rotatably contact a track carried by the other of the connecting portion and the fuselage.

32 Claims, 10 Drawing Sheets

OTHER PUBLICATIONS

Dryden Flight Research Center ED96 43549–2, Photographed Mar. 17, 1996 (1 page) http://www.dfrc.nasa/gov/Gallery/Photo/TU–144LL/Small/ED 96–43549–2.jpg [Accessed Oct. 7, 2003].

Super70s.com, "Konkordski". The Tu–144, Copyright 2002 (4 pages) http://www.super70s.com/Super70s/Science/Transportation/Aviation/TU–144.asp [Accessed Oct. 7, 2003].

North American History, "XB–70A First Flight: 1964," (3 pages) http://www.boeing.com/history/bna/xb70.html [Accessed Sep. 18, 2003].

Niu, Michael C.Y., "Airframe Structural Design, Practical Design Information and Data on Aircraft Structures," Chapter 10 (pages 358–369), Copyright 1988 Conmilit Press, Ltd., Hong Kong.

Roskam, Dr. Jan, "Airplane Design, Part II: Preliminary Configuration Design and Integration of the Propulsion System," (5 pages), Copyright Roskam Aviation and Engineering Corporation, Ottawa, Kansas, First Printing: 1985.

* cited by examiner

METHOD AND APPARATUS FOR ROTATABLY SUPPORTING MOVABLE COMPONENTS, INCLUDING CANARDS

CROSS-REFERENCE TO RELATED APPLICATIONS

This application claims priority to the following U.S. provisional applications, all of which are incorporated herein by reference: 60/420,668 filed Oct. 22, 2002; 60/420,196 filed Oct. 21, 2002; 60/420,670 filed Oct. 22, 2002; and 60/420,621 filed Oct. 22, 2002.

TECHNICAL FIELD

The present disclosure is directed generally to methods and apparatuses for rotatably supporting movable components, including canards.

BACKGROUND

Most existing commercial passenger transport aircraft include a pressurized fuselage, a wing positioned toward the middle of the fuselage, and a tail positioned aft of the wing. The tail typically includes (horizontal) pitch and (vertical) yaw stability and control surfaces, and is mounted to an unpressurized empennage attached to the aft portion of the fuselage. In some arrangements, the entire horizontal portion of the tail moves as a unit relative to the fuselage. In other arrangements, the tail includes a fixed horizontal stabilizer and a movable elevator. In yet another arrangement, the tail includes a slow moving horizontal stabilizer and a fast moving elevator. In any arrangement, the structure required to support the tail surfaces and the actuators required to move the tail surfaces can be located in the unpressurized empennage of the aircraft without impacting the volume of the passenger cabin in the pressurized fuselage.

One drawback with the foregoing arrangement is that it may not be suitable for commercial passenger aircraft having pitch axis stability and control surfaces (such as canards) axially aligned with the pressurized fuselage. For example, integrating the support structure and actuator equipment required for these stability and control surfaces can have a substantial adverse impact on the volume of the passenger cabin.

SUMMARY

The present invention is directed generally toward methods and apparatuses for rotatably supporting movable components, including canards. In one aspect of the invention, an aircraft system includes an airfoil portion configured to be positioned external to an aircraft fuselage, a connecting portion configured to rotatably connect the airfoil portion to the fuselage, and a roller arrangement positioned to be coupled between the connecting portion and the fuselage. The roller arrangement can include a roller support coupleable to one of the fuselage and the connecting portion and an arcuate track coupleable to the other of the fuselage and the connecting portion. The arcuate track can have a contact surface and the roller arrangement can further include at least one roller rotatably carried by the roller support and having an external surface in load bearing contact only with the contact surface of the arcuate track.

In further aspects of the invention, the arcuate track can have an arcuate extent of 360 degrees or less, can face outwardly or inwardly from a rotation axis about which the connecting portion rotates, and/or can include a web portion. The roller arrangement can include one or more thrust rollers having an external surface in load bearing contact only with the web portion of the arcuate track.

An apparatus in accordance with another aspect of the invention includes a first structure, a second structure at least proximate to the first structure and rotatable relative to the first structure about a rotation axis, and a roller arrangement coupled between the first and second structures. The roller arrangement can include a roller support coupled to one of the first and second structures and having a first portion and a second portion. An arcuate track having a contact surface can be coupled to the other of the first and second structures. A first roller can be rotatably carried by the first portion and can have a generally smooth, uniform first external surface in load bearing contact only with the contact surface of the arcuate track. A second roller can be rotatably carried by the second portion of the roller support and can have a generally smooth, uniform second external surface in load bearing contact only with the contact surface of the arcuate track. The first and second rollers can together restrict motion of the second structure relative to the first structure in opposing directions along a normal to the rotation axis.

The invention is also directed to methods for servicing a roller arrangement that is positioned between a first structure and a second structure to allow the second structure to rotate relative to the first structure about a rotation axis. The method can include accessing the roller arrangement, with the roller arrangement including an arcuate track coupled to one of the first and second structures, and a roller support coupled to the other of the first and second structures. The arcuate track can have a web portion carrying a flange portion, with the flange portion having a contact surface. The roller support can carry a first roller with an external surface in load bearing contact only with the contact surface, and a second roller with an external surface in load bearing contact only with the web portion. The method can further include removing one of the first and second rollers from the roller arrangement without removing the other, and replacing the one of the first and second rollers with a replacement roller.

DETAILED DESCRIPTION

The present disclosure describes methods and apparatuses for rotatably supporting movable components, such as canards. Many specific details of certain embodiments of the invention are set forth in the following description and in FIGS. 1–12B to provide a thorough understanding of these embodiments. One skilled in the art, however, will understand that the present invention may have additional embodiments, and that the invention may be practiced without several of the details described below.

Figure 1:
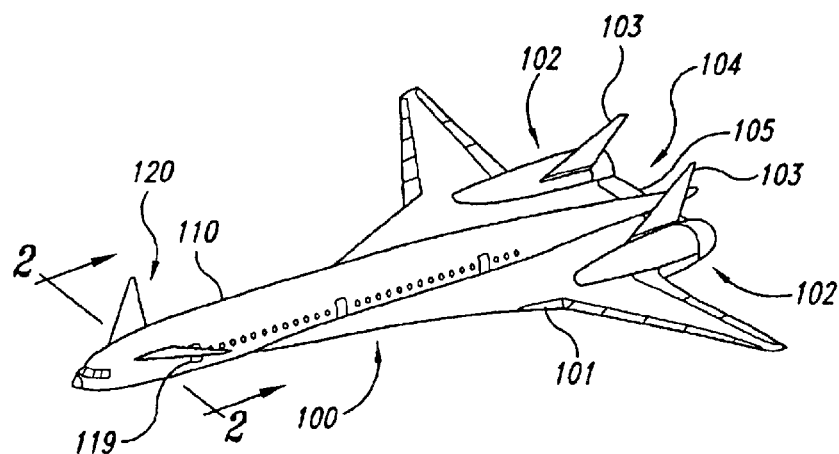
FIG. 1 is a partially schematic, isometric view of an aircraft having a canard assembly in accordance with an embodiment of the invention.

FIG. 1 is a partially schematic, isometric illustration of an aircraft 100 having a canard assembly 120 in accordance with an embodiment of the invention. The canard assembly 120 is attached to a fuselage 110 of the aircraft 100, forward of an aft-mounted wing 101. The aircraft 100 can further include dual propulsion systems 102 integrated with the wing 101, and canted tails 103 mounted at least proximate to the propulsion systems 102 to provide yaw stability and control. An aft body 104 positioned between the propulsion systems 102 and the fuselage 110 can include pitch control surfaces 105 which, together with the canard assembly 120, provide pitch stability and control authority for the aircraft 100.

Figure 2:
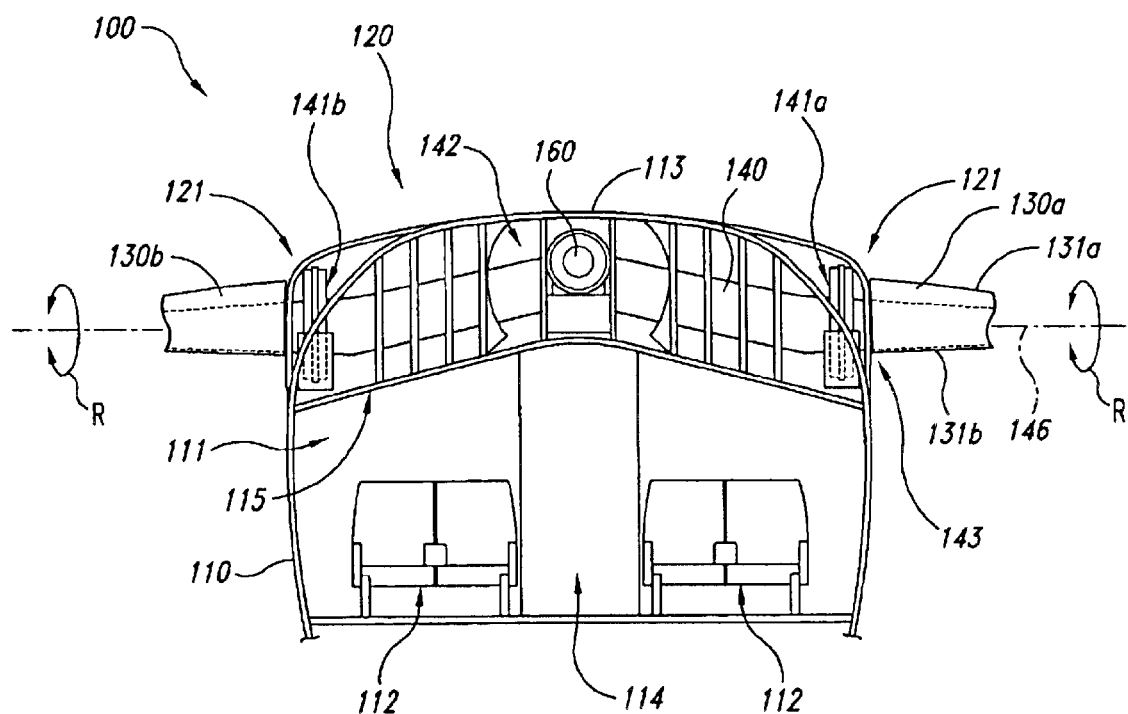
FIG. 2 is a partially schematic, cross-sectional view of a portion of the aircraft shown in FIG. 1 taken substantially along line 2—2.

FIG. 2 is a partially schematic, cross-sectional illustration of an embodiment of the aircraft 100, taken substantially along line 2—2 of FIG. 1. As shown in FIG. 2, the fuselage 110 can include a pressurized cabin 111 having passenger seating 112, one or more aisles 114, galleys, and other features typical of commercial aircraft passenger cabins. The fuselage 110 can further include an unpressurized canard housing 113 positioned above the passenger cabin 111. A ceiling 115 is positioned between the pressurized cabin 111 and the canard housing 113. As described in greater detail below, the canard housing 113 can be sized and positioned to movably support the canard assembly 120 while preserving a large volume for the pressurized cabin 111.

In one embodiment, the canard assembly 120 includes two airfoil portions 130 (shown as a left airfoil portion 130a and a right airfoil portion 130b). Each airfoil portion 130 can include a first or upper surface 131a and a second or lower surface 131b. The airfoil portions 130 can be connected with a connecting portion 140 (such as a spindle) that extends between the airfoil portions 130 through the canard housing 113. Accordingly, the airfoil portions 130 extend external to the fuselage 110, and the connecting portion 140 extends internal to the fuselage 110. An interface region 121 of the canard assembly 120 can be aligned with an external wall of the fuselage 110, between the external portions and the internal portions of the canard assembly 120.

In another aspect of this embodiment, the connecting portion 140 includes two attachment portions 141 (shown as a left attachment portion 141a and a right attachment portion 141b). The attachment portions 141 couple the connecting portion 140 to the fuselage 110 while allowing the connecting portion 140 and the airfoil portions 130 to move relative to the fuselage 110. For example, in one embodiment, the connecting portion 140 and the airfoils 130 can rotate as a unit about a rotation axis 146, as indicated by arrows R. Accordingly, the connecting portion 140 can be coupled to an actuator 160 for active rotation about the rotation axis 146. In other embodiments, the airfoil portions 130 and/or the connecting portion 140 can move relative to the fuselage 110 in other manners.

In a particular aspect of an embodiment in which the connecting portion 140 rotates relative to the fuselage 110, the rotation axis 146 can pass through the interface region 121, and through a minimum cross-sectional area 143 of the connecting portion 140. In another aspect of this embodiment, the connecting portion 140 can include an intermediate region 142 positioned between the attachment portions 141 directly along the rotation axis 146 or offset vertically away from the rotation axis 146. In a further aspect of this embodiment, the intermediate region 142 can have a cross-sectional area that is the same as or larger than that of the minimum cross-sectional area 143. As described in greater detail below with reference to FIGS. 3 and 4, the foregoing features can reduce the impact of the airfoil portions 130 and associated actuation systems on the volume of the pressurized cabin 111.

Figure 3:
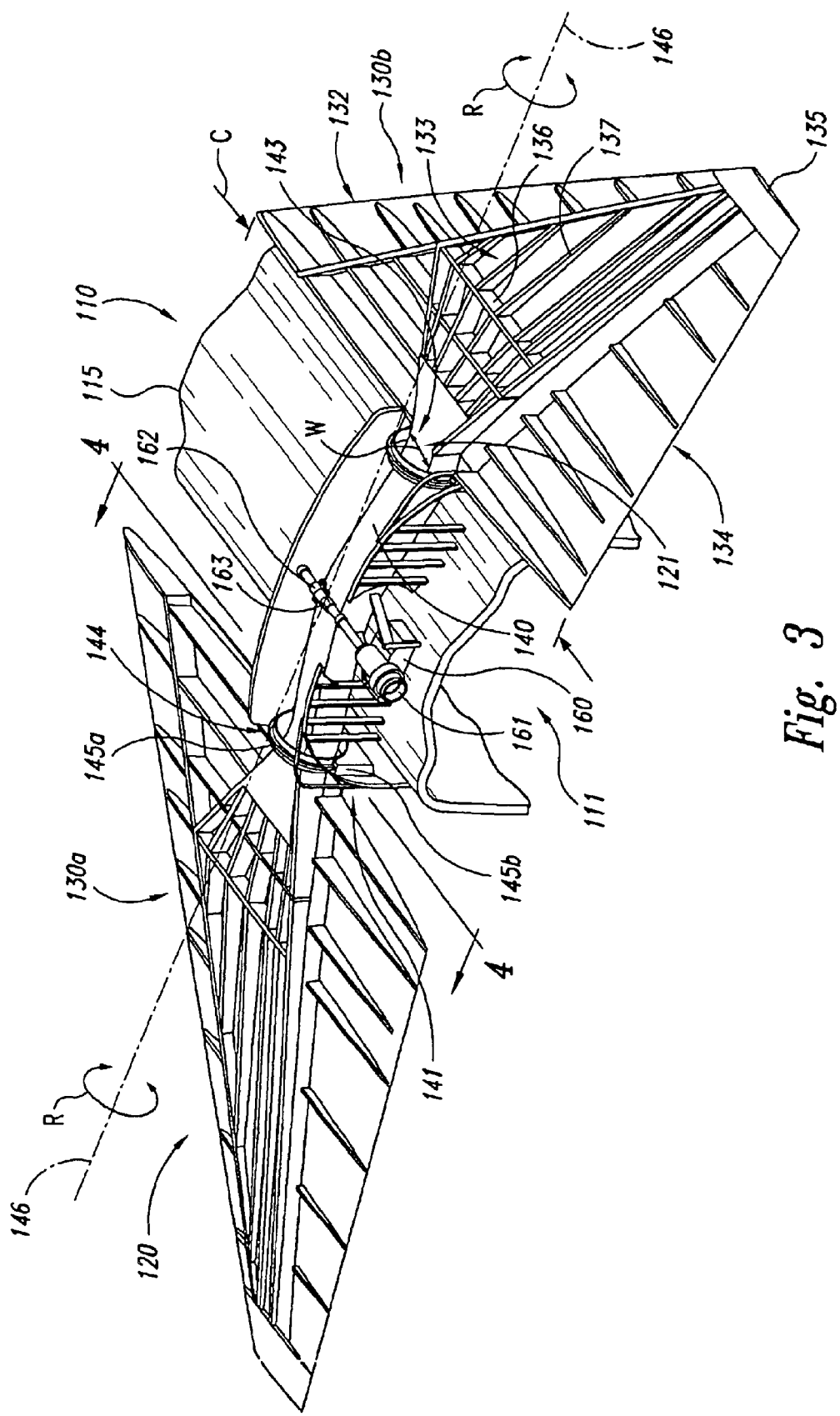
FIG. 3 is a partially schematic, top rear isometric view of a canard assembly configured in accordance with an embodiment of the invention.

FIG. 3 is a partially cutaway, top isometric view of an embodiment of the canard assembly 120 and a portion of the fuselage 110. In one aspect of this embodiment, the airfoil portions 130 of the canard assembly 120 each include a central portion 133, a leading edge 132 forward of the central portion 133, a trailing edge device 134 (e.g., an elevator) aft of the central portion 133, and an outboard tip 135. In one aspect of this embodiment, the trailing edge device 134 can be movable relative to the central portion 133, for example, to provide trim control for the airfoil portion 130. Accordingly, the trailing edge device 134 can be operatively coupled to an actuator (not shown in FIG. 3) positioned in the central portion 133, while the central portion 133 provides pitch control. As a result, the central portion 133 can be actuated at a more rapid rate than the trailing edge device 134. This is unlike some conventional aft-mounted tail arrangements where an all-moving (and slow moving) tail provides trim control and a rapidly moving trailing edge elevator provides pitch control. In other embodiments, the trailing edge can be fixed relative to the central portion 133. In still further embodiments, the leading edge 132 can be movable relative to the central portion 133.

In any of the foregoing embodiments, the components of the airfoil portions 130 can include longitudinal spars 136 and/or transverse stringers 137 arranged to provide a generally rigid structure. In a particular aspect of this embodiment, the stringers 137 of the central portion 133 can converge as they extend inboard toward the fuselage 110. In a further aspect of this embodiment, the stringers 137 can be integrally connected to the connecting portion 140 to provide a strong structural link between the connecting portion 140 and the airfoil portions 130. In other embodiments, the airfoil portions 130 can have other structural arrangements, such as a laminated core construction.

In still a further aspect of this embodiment, the connecting portion 140 can have its minimum cross-sectional area 143 positioned proximate to the interface region 121 between the portion of the canard assembly 120 external to the fuselage 110 and the portion of the canard assembly 120 internal to the fuselage 110. The minimum cross-sectional area 143 can have a width W (e.g., in a chordwise direction) that is relatively small compared to a maximum chord length C of the airfoil 130. For example, in one aspect of this embodiment, the width W can have a value that ranges from about 5% to about 15% of the maximum chord length C. In a particular embodiment, the width W can have a value of about 7% of the maximum chord length C. In any of these embodiments, the rotation axis 146 can pass through the minimum cross-sectional area 143. Accordingly, the maximum excursion of any point on the connecting portion 140 relative to its neutral position is relatively small, even when the airfoil portions 130 rotate through relatively large angular deflections.

In one embodiment, the airfoil portions 130 can rotate through a total angular deflection of about 40° relative to the neutral position. In a particular aspect of this embodiment, the total angular deflection can include about 15° of upward excursion (e.g., with the leading edge 132 deflected upwardly relative to its neutral position by 15°) and about 25° of downward deflection (e.g., with the leading edge 132 deflected downwardly from its neutral position by 25°). In other embodiments, the airfoil portions 130 can rotate through other angular ranges, and/or the angular ranges can have different upward and/or downward components. In any of these embodiments, the impact of these deflections on the available volume of the pressurized cabin 111 can be relatively small because, for example, (a) the connecting portion 140 has a relatively small cross-sectional area, relative to the maximum chord length of the airfoil portions 130 and (b) the rotation axis 146 passes through the interface region 121 and the minimum cross-sectional area 143.

In one embodiment, the attachment portions 141 each include a bearing 144 positioned to allow rotational motion of the connecting portion 140. In one aspect of this embodiment, each bearing 144 can include an arcuate first bearing surface 145a depending from the connecting portion 140 and engaged with an arcuate second bearing surface 145b depending from the fuselage 110. The bearing 144 can include a ball bearing arrangement, a roller bearing arrangement or other bearing arrangements known to those of ordinary skill in the art. Further details of other bearing arrangements are described below with reference to FIGS. 6–12B. In any of these embodiments, the bearing arrangement can accommodate the rotational motion of the connecting portion 140 and the airfoil portions 130 relative to the fuselage 110.

An actuator 160 imparts the rotational motion to the connecting portion 140. In one embodiment, the actuator 160 includes a rotary motor 161 coupled to a ball screw 162. The ball screw 162 can engage a corresponding ball nut 163 which is coupled to the connecting portion 140 with a gimbal mount. As the shaft of the motor 161 rotates, the ball screw 162 threadably engages the ball nut 163, driving the nut 163 forward and aft along an arcuate path, which rotates the connecting portion 140 and the airfoil portions 130 about the rotation axis 146. In a particular aspect of this embodiment, the actuator 160 can operate at relatively high rates. For example, the actuator 160 can drive the airfoil portions 130 at a rate of about 20° or more per second. In a particular example, the airfoil portions 130 can move at a rate of about 40° or more per second. The ball screw 162 can rotate at rates up to and above 900 rpm to provide the rapid rotation rate of the airfoil portions 130. In other embodiments, the actuator 160 can include other arrangements and can operate at other speeds. For example, the actuator 160 can include a linear actuator and/or a rack and pinion arrangement.

Figure 4:
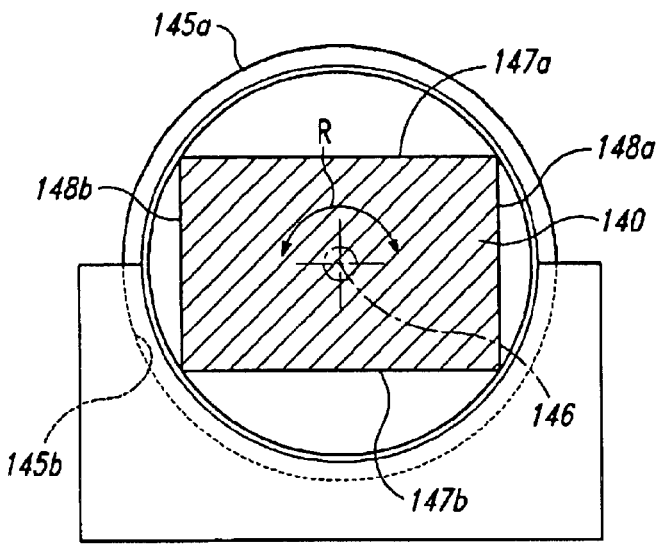
FIG. 4 is a partially schematic, cross-sectional view of a connecting portion of a canard assembly configured in accordance with an embodiment of the invention.
Figure 5:
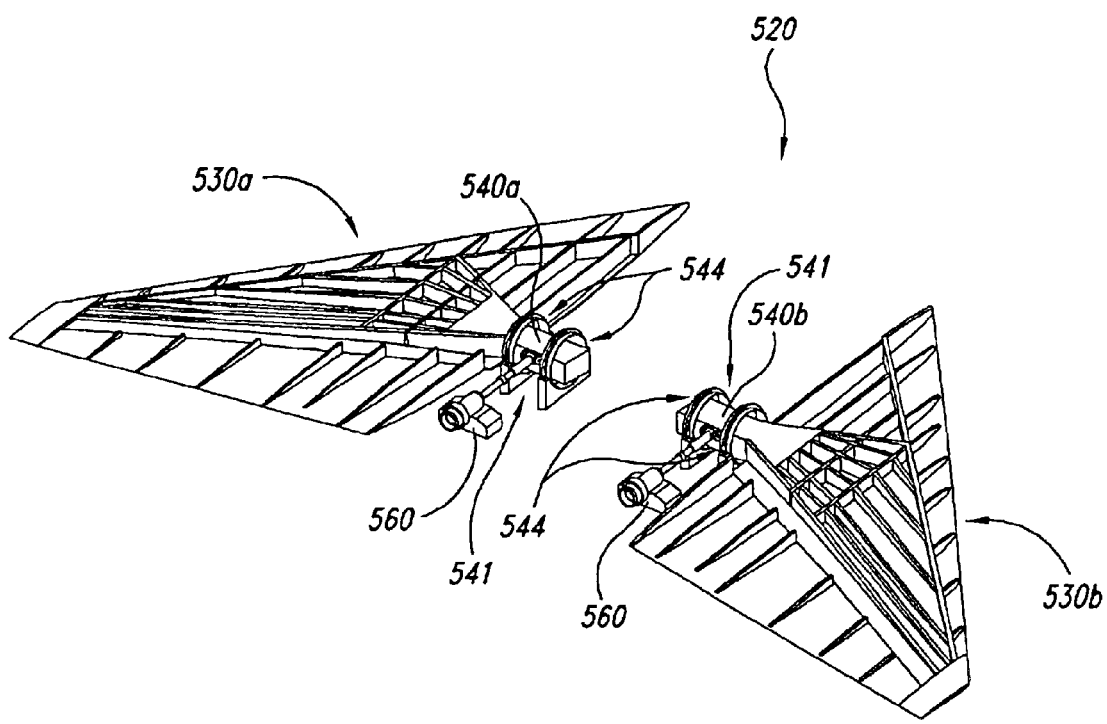
FIG. 5 is a top rear isometric view of a canard assembly having cantilevered airfoils in accordance with another embodiment of the invention.

FIG. 4 is a partially schematic illustration of part of the connecting portion 140 taken substantially along line 4—4 of FIG. 3. In one embodiment, the connecting portion 140 can have a generally rectangular cross-sectional shape, and in other embodiments, the connecting portion 140 can have other cross-sectional shapes. In any of these embodiments, the connecting portion 140 can be configured to carry bending loads from the airfoil portions 130 (FIG. 3) to the fuselage 110 (FIG. 3). For example, when the airfoil portions 130 are subjected to vertical loads, the connecting portion 140 can transmit bending loads along first and second vertical load paths 147a and 147b. When the airfoils 130 are subjected to longitudinal loads, the connecting portion 140 can transmit loads along first and second longitudinal load paths 148a, 148b. The rotation axis 146 can be positioned between any pair of load paths to provide for a compact arrangement with a relatively low rotational moment of inertia.

One feature of an embodiment of the canard assembly 120 described above with reference to FIGS. 1–4 is that the connecting portion 140 has a relatively small cross-sectional area, and a relatively small width W compared to the maximum chord length C of the airfoil portions 130 that it supports. An advantage of this feature is that the connecting portion 140 occupies a relatively small volume within the fuselage 110, while still providing adequate support to the airfoil portions 130. Accordingly, the impact of the connecting portion 140 on the volume of the pressurized cabin 111 is relatively small. This is unlike some existing canard attachment arrangements for which the structure passing into the aircraft fuselage has a width of from about 50% to about 75% of the maximum chord length of the corresponding airfoil.

Another feature of an embodiment of the canard assembly 120 described above with reference to FIGS. 1–4 is that the rotation axis 146 passes through the interface region 121, the minimum cross-sectional area 143, and/or a region between the load paths that carry loads from the airfoil portions 130 to the fuselage 110. Accordingly, points on the connecting portion 140 remain relatively close to the rotation axis 146 as the airfoil portions 130 rotate. This is unlike some existing tail attachment arrangements for which the attachment structure is pivoted at its extreme forward or aft edge and accordingly sweeps out a large volume as it rotates. An advantage of arrangements in accordance with embodiments of the present invention is that the impact of the connecting portion 140 on the volume of the pressurized cabin 111 can be substantially less than with conventional arrangements, even though the airfoil portions 130 rotate through a relatively large angular range. Another advantage of this arrangement is that the rotational moment of inertia of the connecting portion 140 is relatively small, which allows the connecting portion 140 to be rotated at relatively high speeds.

Still another feature of an embodiment of the canard assembly 120 described above with reference to FIGS. 1–4 is that the connecting portion 140 can include an intermediate region 142 that is vertically offset from the attachment portions 141. An advantage of this feature is that the canard housing 113 into which the connecting portion 140 fits can be vertically offset over the aisle 114 of the pressurized cabin 111, allowing for greater mobility of the passengers within.

Yet another feature of an embodiment of the canard assembly 120 is that it can include an all-moving, high rotation rate central portion 133 and an independently movable trailing edge device 134. This design, when coupled with a fly-by-wire control system, can allow for the rapid attainment of maximum control authority when needed, while still maintaining the ability to position the surfaces optimally for best airplane performance. This design can also reduce the size of the canard assembly 120, thus providing weight and cost benefits to the aircraft on which it is installed. Another advantage of this arrangement is that the trailing edge devices 134 on opposite sides of the fuselage 110 can be independently actuated in an asymmetric fashion to generate yaw control, which can allow for a reduction in the size of the aircraft vertical tails, providing another potential weight and cost benefit.

In other embodiments, the canard assembly can have other arrangements that also have a reduced impact on the volume of the pressurized cabin 111 of the fuselage 110. For example, in one embodiment shown in FIG. 5, a canard assembly 520 can include airfoil portions 530a and 530b, each of which has a separate connecting portion 540 (shown as a first connecting portion 540a and a second connecting portion 540b). Each connecting portion 540 extends into the fuselage 110 (FIG. 2) and includes a corresponding attachment portion 541. The attachment portions 541 can each include two bearings 544 that support the airfoil portions 530 in a dual cantilevered arrangement. Each connecting portion 540 can also be coupled to an actuator 560 to drive the airfoil portions 530 through a range of angles at a range of angular velocities generally similar to those described above with reference to FIGS. 1–4. The structure required to support and operate the actuators 560 can be positioned in opposing vertically aligned, closet-type structures in the fuselage 110. Accordingly, an advantage of this arrangement is that it can have a reduced impact on the head room within the pressurized cabin 111. Conversely, an advantage of the arrangement described above with reference to FIGS. 1–4 is that it does not have a substantial impact on the lateral volume of the pressurized cabin 111. A further advantage of the arrangement described above with reference to FIGS. 1–4 is that the connecting portion 140 extends entirely through the fuselage 110 and is attached to both airfoil portions 130, which is generally structurally more efficient than the cantilevered arrangement shown in FIG. 5.

Figure 6:
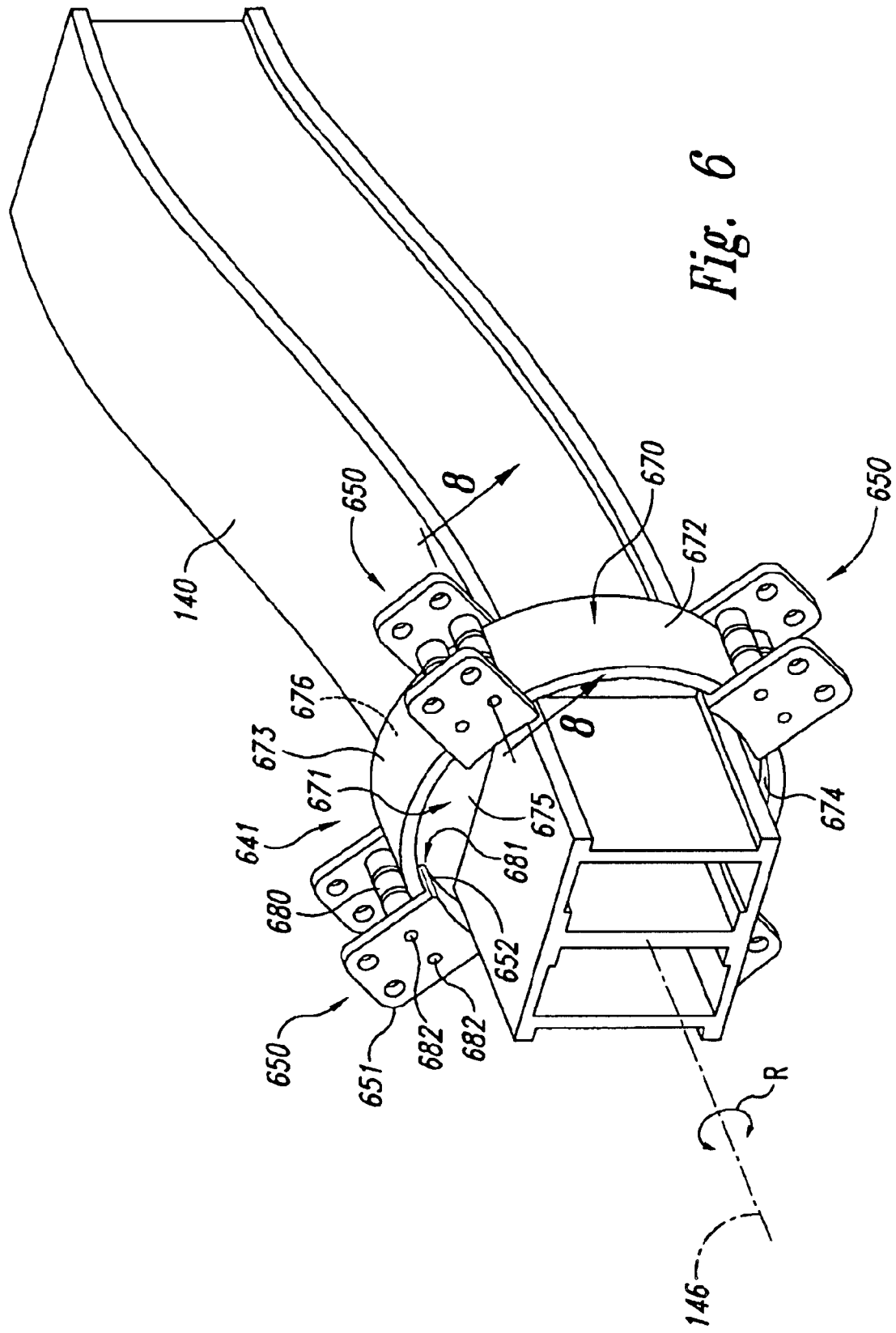
FIG. 6 is a top isometric view of an arrangement for supporting a connecting portion of a canard assembly in accordance with an embodiment of the invention.

FIGS. 6–12B illustrate arrangements for rotatably supporting connecting portions, such as those described above with reference to FIGS. 2–5, in accordance with several embodiments of the invention. In one embodiment, shown in isometric view in FIG. 6, the connecting portion 140 includes an attachment portion 641 that allows the connecting portion 140 to rotate relative to the fuselage 110 (FIG. 2). In one aspect of this embodiment, the attachment portion 641 includes a roller support arrangement having one or more brackets 650 (four are shown in FIG. 6) attached to the fuselage 110, and a track 670 attached to the connecting portion 140. A plurality of rollers can be supported by the brackets 650 and can rotatably contact the track 670 provide for smooth, low friction, rotational motion of the connecting portion 140, as described in greater detail below.

In one embodiment, the track 670 forms a complete circle and can accordingly allow 360° rotation of the connecting portion 140. In other embodiments, the track 670 can have arcuate lengths of less than 360°. In any of these embodiments, the track 670 can include a radially extending web 671 supporting a circumferentially extending flange 672. The web 671 can include a web outboard surface 675 facing opposite from a web inboard surface 676. The flange 672 can include a flange inner surface 674 facing opposite from a flange outer surface 673.

In one embodiment, the brackets 650 can include rollers that engage both the web 671 and the flange 672 of the track 670. For example, the bracket 650 can include a plurality of radial rollers 680 that can roll along the flange outer surface 673, and a plurality of thrust rollers 681 that can roll along the web outboard surface 675 and the web inboard surface 676. Suitable rollers are available from The Timken Company of Canton, Ohio or from other bearing component manufacturers. In any of those embodiments, each bracket 650 can include a radial roller support 651 which carries the radial rollers 680 on radial roller pins 682. Each bracket 650 can further include a thrust roller support 652 which rotatably carries the thrust rollers 681, as described in greater detail below with reference to FIGS. 7 and 8.

Figure 7:
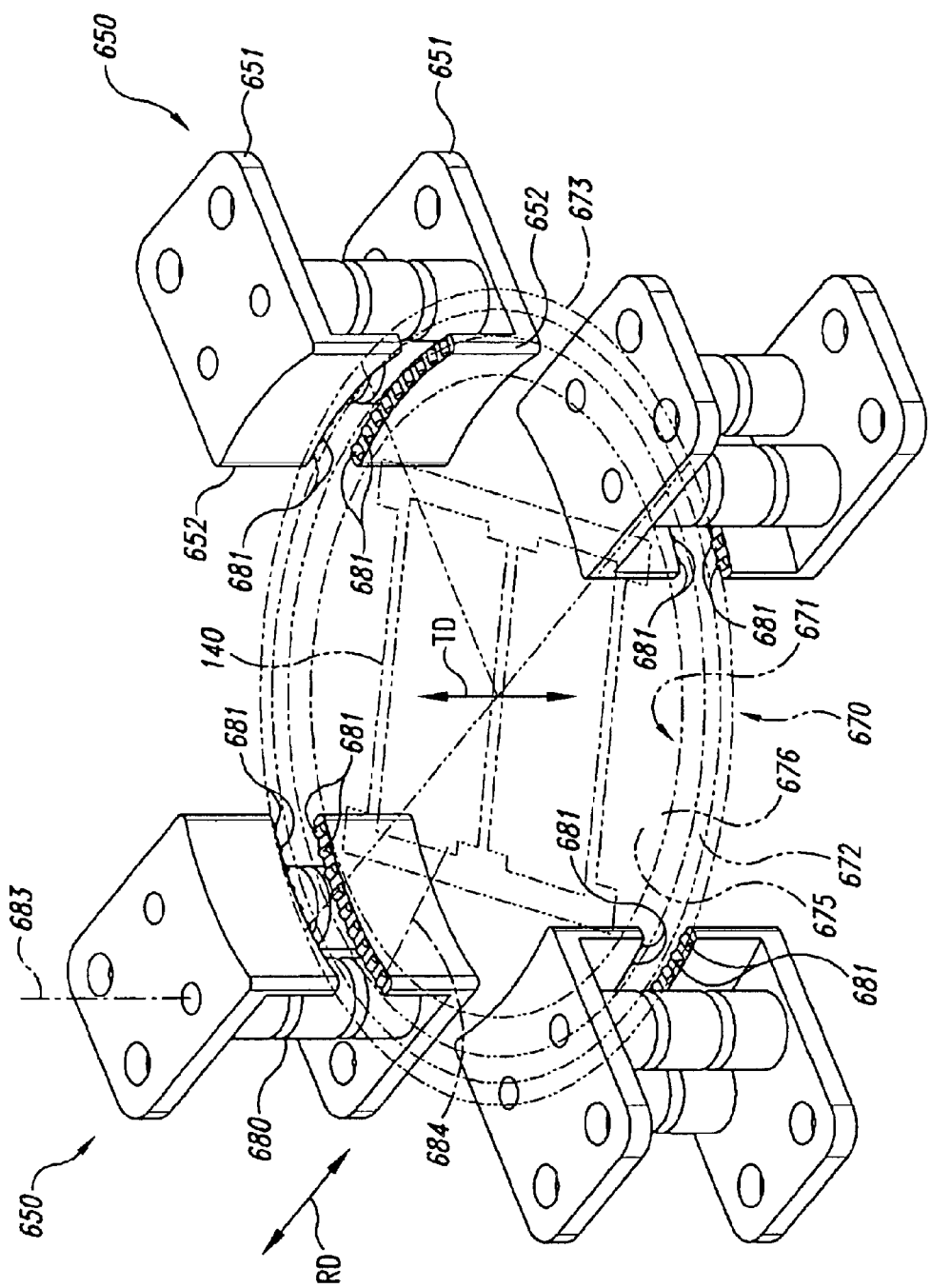
FIG. 7 is an isometric view of a portion of the attachment arrangement shown in FIG. 6.

FIG. 7 is a partially schematic, isometric view of an embodiment of the brackets 650 and the track 670, with the track 670 shown in phantom lines to make portions of the brackets 650 more visible. As shown in FIG. 7, opposing sets of thrust rollers 681 rotatably contact and roll along the opposing web inboard and outboard surfaces 675, 676. Accordingly, the thrust rollers 681 rotate about corresponding thrust roller axes 684. The radial rollers 680 rotate about radial roller axes 683 (which can be orthogonal to the thrust roller axes 684) to engage the flange outer surface 673. Accordingly, the thrust rollers 681 can provide support for the connecting portion 140 in a thrust direction TD, and the radial rollers 680 can provide support for the connecting portion 140 in a radial direction RD.

Figure 8:
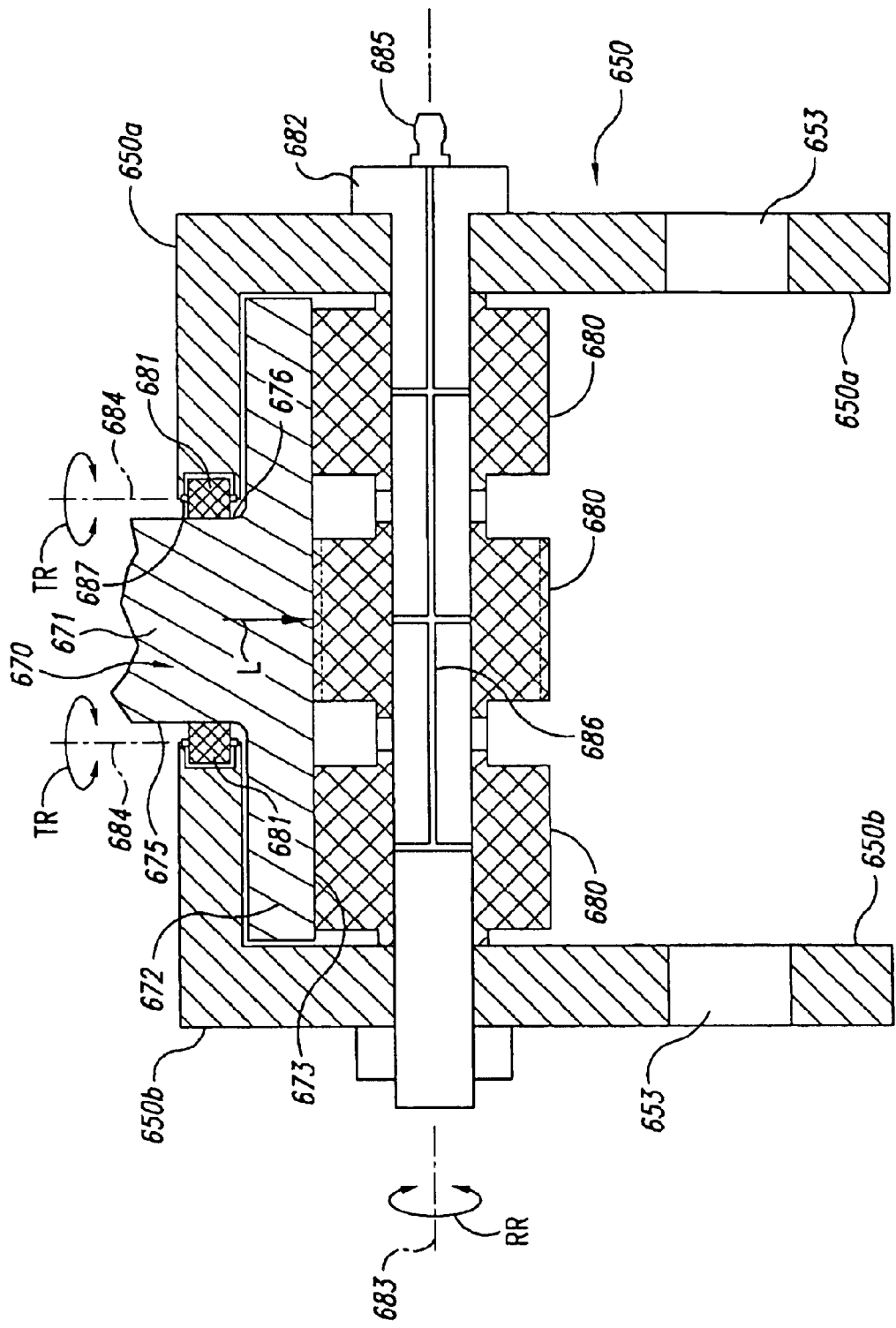
FIG. 8 is a partially schematic, cross-sectional view of a portion of a bracket of the assembly taken substantially along line 8—8 of FIG. 6.

FIG. 8 is a partially schematic, cross-sectional view of a portion of the track 670 and one of the brackets 650, taken substantially along line 8—8 of FIG. 6 in accordance with an embodiment of the invention. As shown in FIG. 8, the thrust rollers 681 rotate about the thrust roller axes 684 (indicated by arrows TR), and the radial rollers 680 rotate about the radial roller axis 683 (indicated by arrows RR). Accordingly, the thrust rollers 681 can be supported by thrust roller pins 687 oriented at least approximately orthogonal to the radial roller pin 682. In one aspect of this embodiment, the radial roller pin 682 can include a grease fitting 685 coupled to a grease channel 686 to provide lubricant to the radial rollers 680.

In one aspect of an embodiment shown in FIG. 8, each of the radial rollers 680 has a generally similar diameter. In another embodiment one of the radial rollers 680 (e.g., the central radial roller 680) has a smaller diameter than the others, as indicated in dashed lines in FIG. 8. Accordingly, when a radial load L is applied to the radial rollers 680, the outermost rollers can bear the load until, under heavy load and deflection, the track 670 bears against the central radial roller 680 as well. In either embodiment, when the radial rollers 680 are under the radial load L, they can place a bending load on the radial roller pin 682, which is transmitted to the bracket 650. This load can be reacted by the track 670 at the interface between the web 671 and the thrust rollers 681. Accordingly, this arrangement can internally balance the loads placed on the radial rollers 680.

One feature of an embodiment of the foregoing arrangement described above with reference to FIG. 8 is that the radial rollers 680 can be easily removed for maintenance and/or replacement by removing the radial roller pin 682. Accordingly, the radial rollers 680 can be accessed and/or removed without removing the brackets 650, the track 670 or the thrust rollers 681. An advantage of this feature is that the radial rollers 680 can be more easily maintained than can some conventional bearing devices.

Another feature of an embodiment of the arrangement shown in FIG. 8 is that the bracket 650 can include two bracket halves 650a, 650b. Each bracket half 650a, 650b can be separately mounted to the fuselage 110 (FIG. 2) with fasteners that pass through mounting holes 653. An advantage of this arrangement is that each bracket half 650a, 650b can be separately removed from the fuselage 110 without disturbing the other. Accordingly, the thrust rollers 681 carried by one of the bracket halves can be accessed and/or serviced and/or replaced without disturbing the thrust roller 681 coupled to the other bracket half.

Still another feature of an embodiment of the arrangement described above with reference to FIGS. 6–8 is that the thrust rollers 681 and the radial rollers 680 can smoothly support rotational motion of the connecting portion 140 while restricting the motion of the connecting portion 140 in two transverse directions (e.g., the thrust direction TD and the radial direction RD). An advantage of this feature is that the connecting portion 140 can be adequately supported and can have a reduced tendency to vibrate, when compared with other conventional bearing arrangements.

Still another feature of an embodiment of the foregoing arrangement is that the outer surfaces of the radial rollers 680 and the thrust rollers 681 can engage only a single surface as they rotate. For example, the radial rollers 680 can engage only the flange outer surface 673, and the thrust rollers 681 can engage either the web inboard surface 675 or the web outboard surface 676. Accordingly, the radial rollers 680 can orbit the connecting portion 140 at the same angular rate as the connecting portion 140 rotates about the rotation axis 146. This is unlike conventional roller bearing and ball bearing arrangements, for which the rolling elements engage both opposing inner and outer races and orbit at half the above angular rate. An advantage of this feature is that the friction and wear generated by the rollers 680, 681 can be reduced when compared with conventional arrangements. Furthermore, in an arrangement having a plurality of radial rollers 680 at a corresponding plurality of circumferential positions around the track 670, any one radial roller 680 can be removed and replaced while the remaining radial rollers 680 continue to support one structure (e.g., the canard 120 shown in FIG. 2) relative to another (e.g., the fuselage 110 shown in FIG. 2).

Figure 9B:
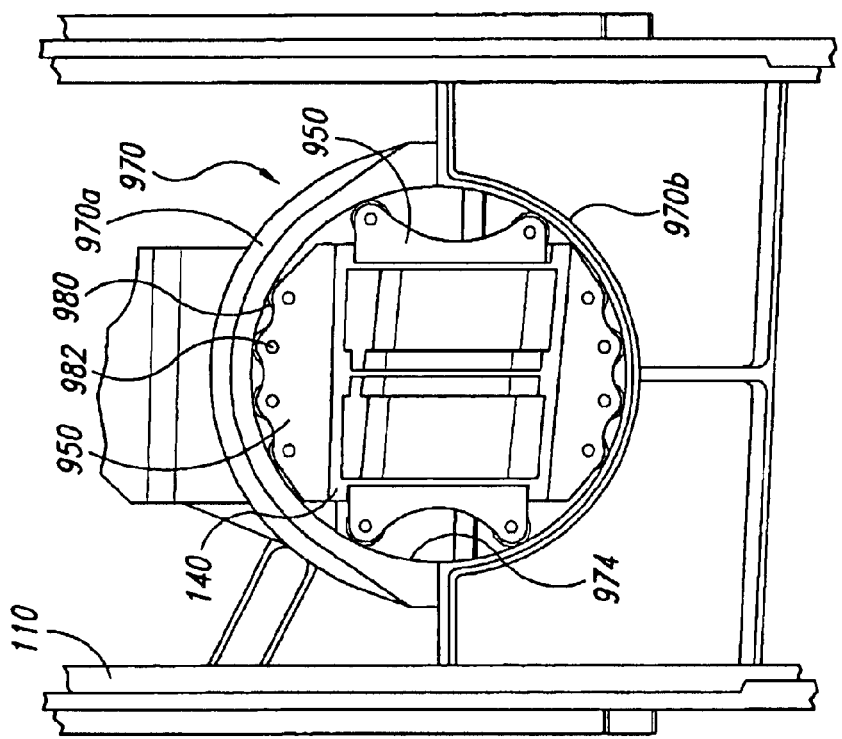
FIGS. 9A–9B illustrate an arrangement for supporting a connecting portion of a canard assembly in accordance with another embodiment of the invention.
Figure 9A:
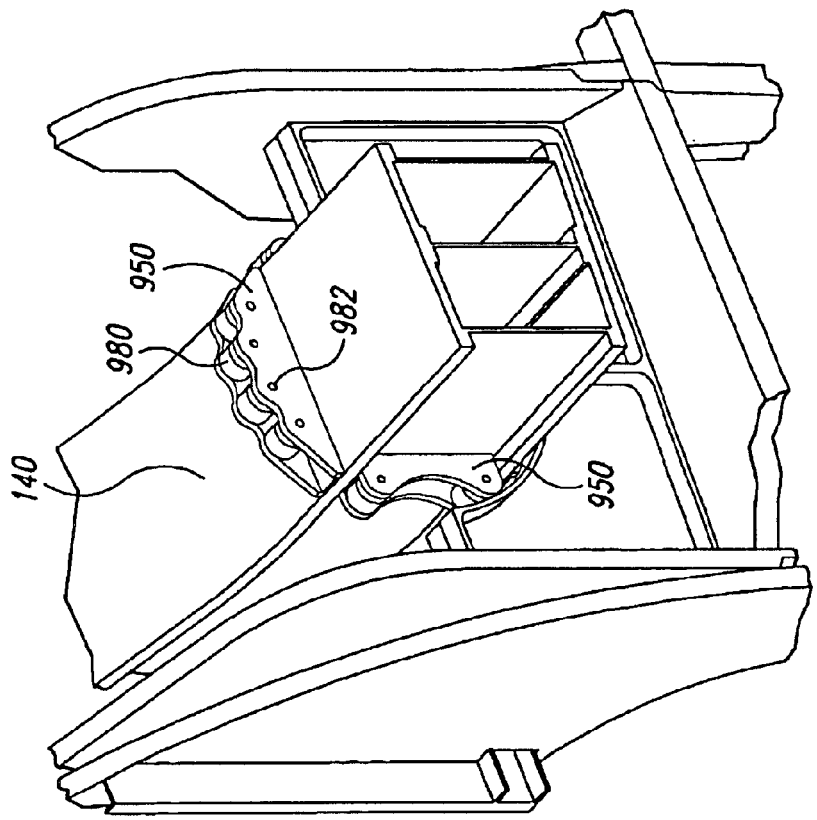

FIGS. 9A–9B illustrate an arrangement for supporting the connecting portion 140 in accordance with another embodiment of the invention. Referring first to FIG. 9A, the arrangement can include a plurality of brackets 950 fixedly attached to the connecting portion 140. Each bracket 950 can include a plurality of radial rollers 980 supported for rotation relative to the brackets 950 by radial roller pins 982.

Referring now to FIG. 9B, a generally circular track 970 can be positioned around the connecting portion 140 and can be fixedly attached to the fuselage 110. The track 970 can include a track inner surface 974 along which the radial rollers 980 roll as the connecting portion 140 rotates relative to the fuselage 110. In one aspect of this embodiment, the track 970 can include a first track portion 970a and a second track portion 970b, with the first track portion 970a independently removable from the fuselage 110 to allow access to the brackets 950 and the radial rollers 980. The track 970 can extend circumferentially for 360° in one embodiment, and can extend circumferentially for less than 360° in other embodiments in a manner generally similar to that described above with reference to FIG. 6.

Figure 10B:
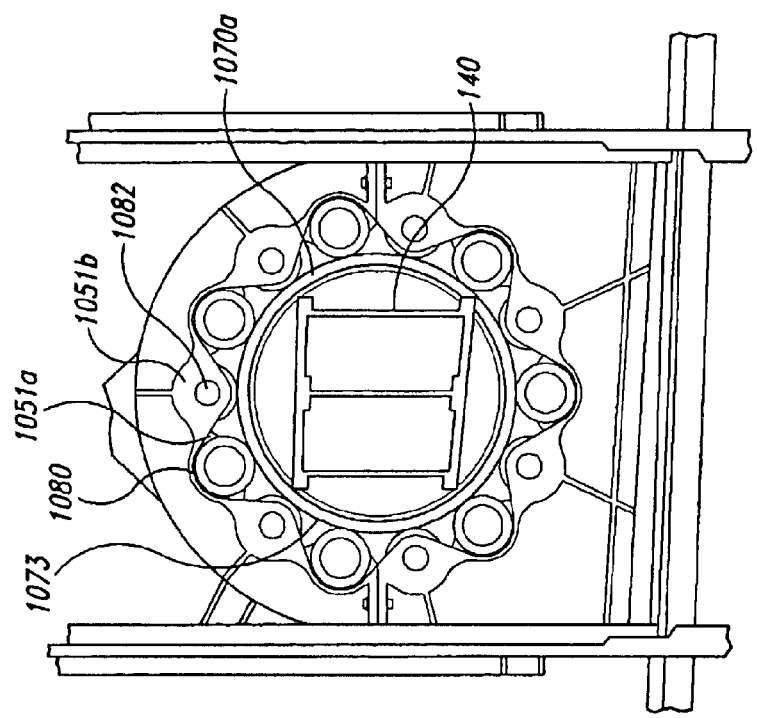
FIGS. 10A–10B illustrate an arrangement for supporting a connecting portion of a canard assembly in accordance with yet another embodiment of the invention.
Figure 10A:
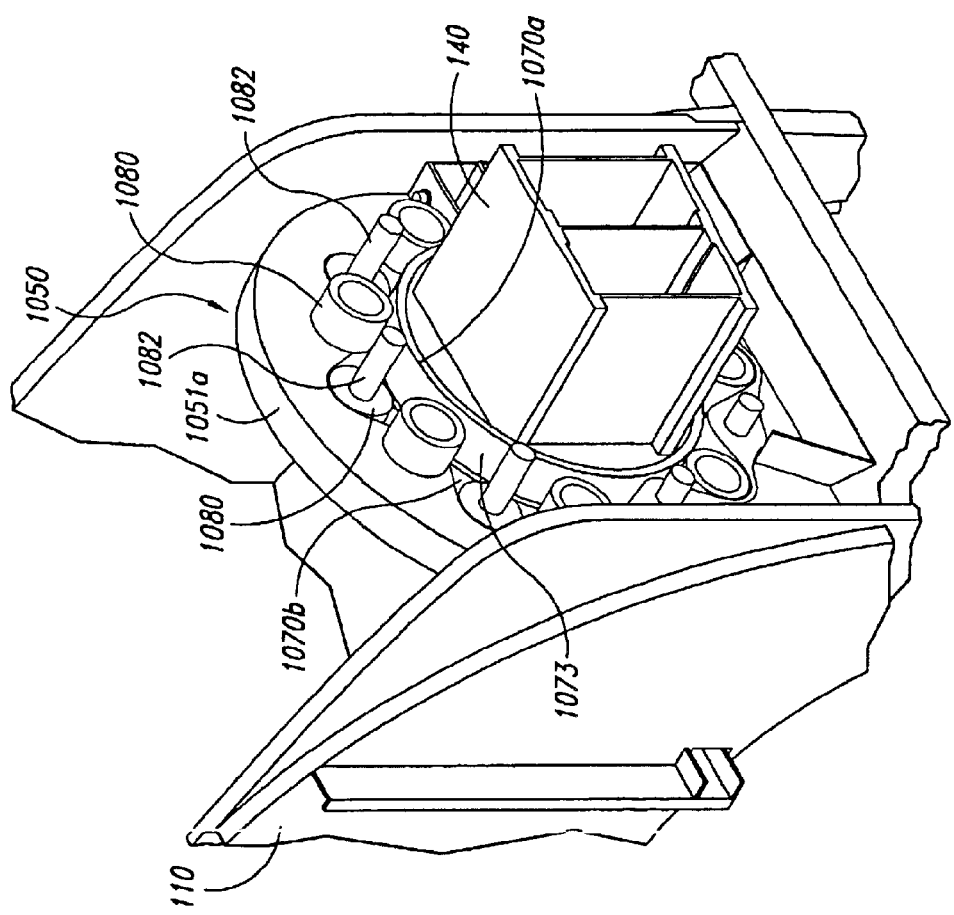

FIG. 10A is a partially schematic isometric view of an arrangement for supporting the connecting portion 140 in accordance with another embodiment of the invention. FIG. 10B is a partially schematic end view of the arrangement show in FIG. 10A. Referring first to FIG. 10A, the arrangement can include a bracket 1050 having a first radial roller support 1051a and a parallel second radial roller support 1051b (FIG. 10B). For purposes of illustration, the second radial roller support 1015b is not shown in FIG. 10A. Each radial roller support 1051a, 1051b supports a plurality of radial rollers 1080 on a corresponding plurality of radial roller pins 1082. The radial rollers 1080 carried by the first radial roller support 1051a bear against a first track 1070a, and the radial rollers carried by the second radial roller support 1051b bear against an adjacent second track 1070b. Each of the tracks 1070a, 1070b can be fixedly attached to the connecting portion 140 and can have a track outer surface 1073 along which the radial rollers 1080 roll as the connecting portion 140 rotates relative to the fuselage 110.

Referring now to FIG. 10B (and as described above with reference to FIGS. 6–8), the external surfaces of each of the radial rollers 1080 contact only a single surface (i.e., the track outer surface 1073) of the corresponding track 1070a, 1070b. Accordingly, the radial rollers 1080 can be less likely than conventional roller bearings and/or ball bearings to wear and/or generate excess friction.

Figure 11B:
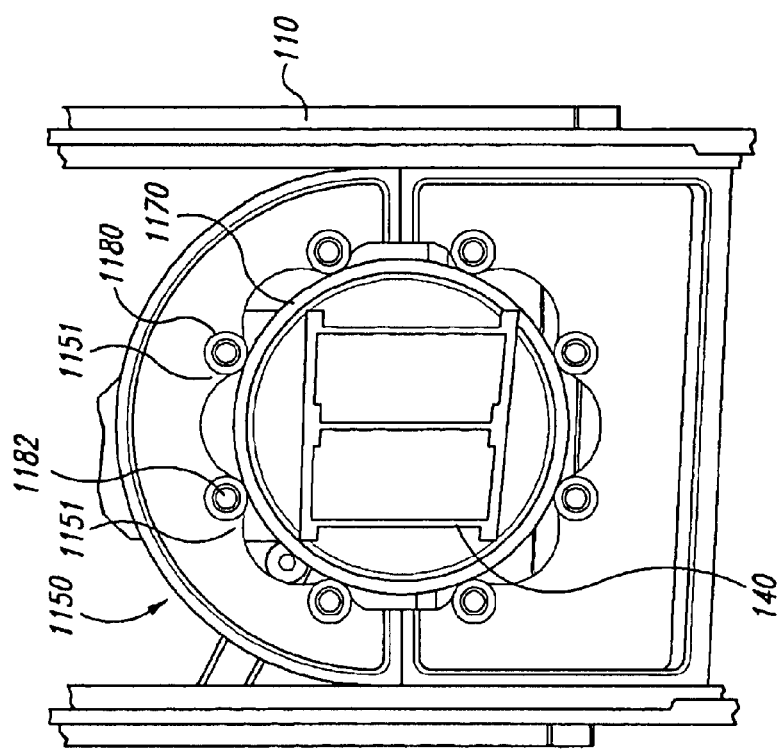
FIGS. 11A–11B illustrate an arrangement for supporting a connecting portion of a canard assembly in accordance with still another embodiment of the invention.
Figure 11A:
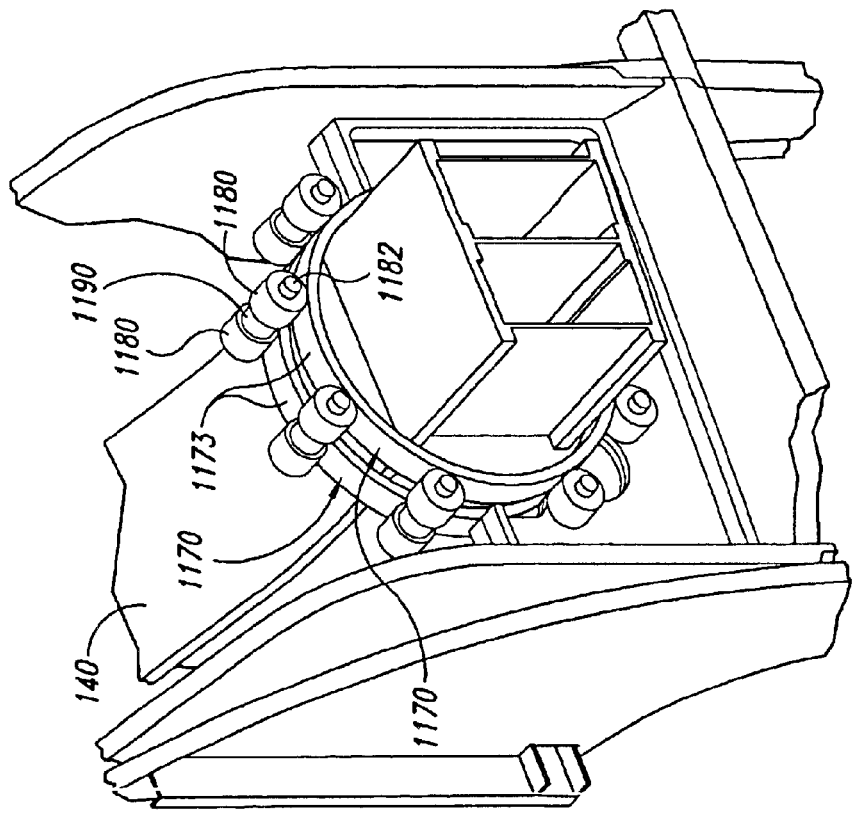

FIGS. 11A–11B illustrate an arrangement for rotatably supporting the connecting portion 140 in accordance with still another embodiment of the invention. In one aspect of this embodiment, the arrangement includes a pair of tracks 1170, each having a track outer surface 1173 and being fixedly attached to the connecting portion 140. Paired radial rollers 1180 roll along the track outer surfaces 1173 as the connecting portion 140 rotates. In one embodiment, each pair of radial rollers 1180 can be supported on a radial roller pin 1182. In one aspect of this embodiment, the radial roller pin 1182 can include a spherical bearing 1190 by which the radial roller pin 1182 is supported. For example, as shown in FIG. 11B, a bracket 1150 can include a plurality of radial roller supports 1151, each of which extends between two coaxial radial rollers 1180 and connects to the corresponding spherical bearing 1190 (FIG. 11A).

Figure 12A:
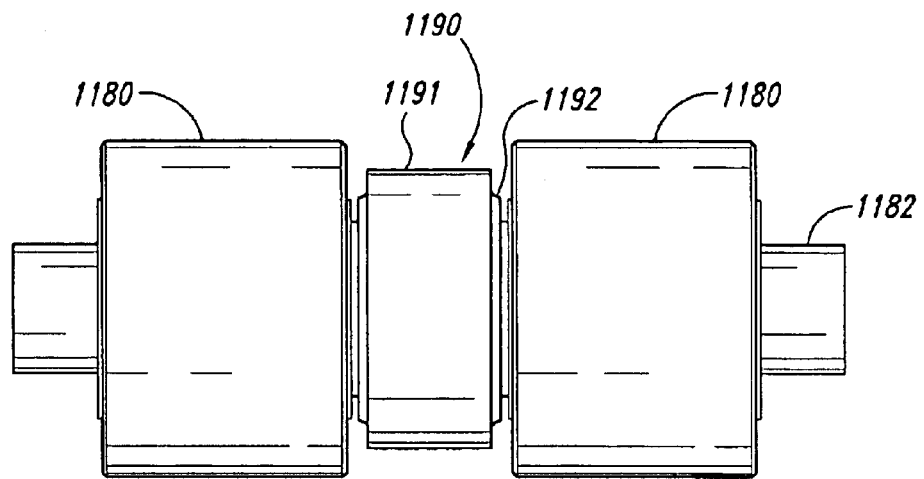
FIGS. 12A–12B illustrate rollers of an embodiment of the arrangement shown in FIGS. 11A–11B.

FIG. 12A is a top view of one of the radial roller pins 1182 described above with reference to FIGS. 11A–11B. As shown in FIG. 12A, the radial roller pin 1182 can include a spherical bearing 1190 positioned between the radial rollers 1180. The spherical bearing 1190 can include an inner spherical bearing member 1192 (which is fixedly attached to the radial roller pin 1182) and an outer spherical bearing member 1191 (which is fixedly attached to the bracket 1150 (FIG. 11B)).

Figure 12B:
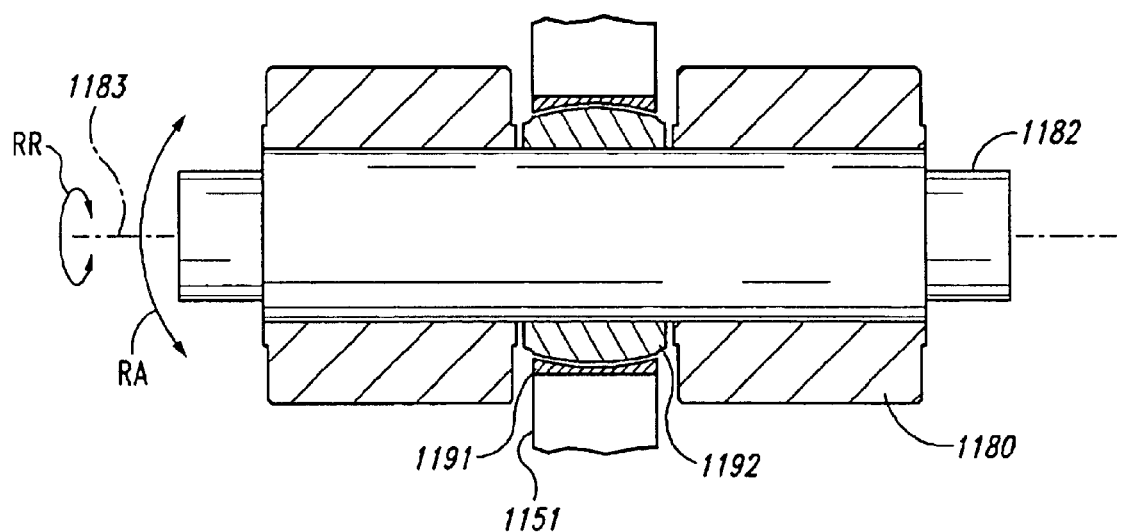

As shown in FIG. 12B, the inner spherical bearing member 1192 can include a convex outer surface which contacts a corresponding concave inner surface of the outer spherical bearing member 1191. Accordingly, the spherical bearing 1190 can accommodate some misalignment and/or rocking (as indicated by arrow RA), while the radial roller pin 1182 and the radial rollers 1180 rotate about a radial roller axis 1183 (as indicated by arrow RR).

From the foregoing, it will be appreciated that, although specific embodiments of the invention have been described herein for purposes of illustration, various modifications may be made without deviating from the spirit and scope of the invention. For example, the rollers can be rotatably supported by the connecting portion and can roll along a track that is fixed relative to the fuselage. Support arrangements in accordance with other embodiments of the invention can include more or fewer brackets than described above, and/or more or fewer rollers than described above. In a particular embodiment, the arrangement can include rollers positioned at at least two spaced-apart circumferential locations, and in a further particular embodiment, at at least three spaced-apart circumferential locations. In any of these embodiments, the rollers can restrict the motion of the rotating structure (e.g., a canard) in opposing directions normal to the axis about which the rotating structure rotates. The number and orientation of brackets and rollers can be selected based on factors such as the loads expected to be carried by the rotating connecting portion. In still further embodiments, arrangements such as those described above can support rotating components other than canards. For example, support arrangements in accordance with other embodiments of the invention can be included with devices such as actuated bridges and cranes. Support arrangements in accordance with still further embodiments of the invention can be applied to other devices which can benefit from smooth rotary motion and potentially significant weight savings. Other arrangements of structures having characteristics in common with those disclosed herein are included in the following pending U.S. Applications, both of which are filed concurrently herewith and both of which are incorporated herein by reference: Ser. No. 10/689,972, entitled "Method and Apparatus for Installing and Activating Movable Airtails, Including Canards," and Ser. No. 10/690,283, entitled "Method and Apparatus for Activating Movable Components, Including Canards, Over Multiple Ranges". Accordingly, the invention is not limited except as by the appended claims.

We claim:

1. An aircraft system, comprising:
   an airfoil portion configured to be positioned external to an aircraft fuselage;
   a connecting portion configured to rotatably connect the airfoil portion to the fuselage; and
   a roller arrangement positioned to be coupled between the connecting portion and the fuselage, the roller arrangement including:
      a roller support coupleable to one of the fuselage and the connecting portion;
      an arcuate track coupleable to the other of the fuselage and the connecting portion, wherein the arcuate track includes a flange portion having a contact surface, and a web portion disposed inwardly from the flange portion, the web portion being generally normal to the flange portion;
   a first roller rotatable about a first axis and rotatably carried by the roller support, the first roller having an external surface, the external surface of the first roller being in load bearing contact only with the contact surface of the arcuate track; and
   a second roller having an external surface in contact with the web portion, the second roller being rotatable about a second axis generally normal to the first axis, the first and second rollers restricting motion of the airfoil portion relative to the arcuate track in directions generally normal to the first and second axes while allowing the connecting portion to rotate relative to the arcuate track.

2. The system of claim 1 wherein the arcuate track includes a flange portion having the contact surface, and a web portion disposed inwardly from the flange portion.

3. The system of claim 1 wherein the web portion has a first surface in contact with the second roller and a second surface facing opposite from the first surface, and wherein the roller support includes a first portion and a second portion removably coupled to the first portion, further wherein the first roller is positioned between the first and second portions of the roller support, the second roller is carried by the first portion of the roller support and wherein the roller arrangement further includes a third roller having an external surface in contact with the second surface of the web portion, the third roller being rotatable about a third axis generally normal to the first axis and generally parallel to the second axis, the third roller being carried by the second portion of the roller support, the second portion of the roller support being removable from the first portion of the roller support to allow access the third roller.

4. The system of claim 1 wherein the arcuate track has an arcuate extent of less than 360 degrees.

5. The system of claim 1, wherein the arcuate track has an arcuate extent of 360 degrees.

6. The system of claim 1 wherein the connecting portion is rotatable relative to the arcuate track about a rotation axis, and wherein the contact surface of the arcuate track faces outwardly away from the rotation axis.

7. The system of claim 1 wherein the connecting portion is rotatable relative to the arcuate track about a rotation axis, and wherein the contact surface of the arcuate track faces inwardly toward the rotation axis.

8. The system of claim 1 wherein the arcuate track includes a first arcuate track, and wherein the system further comprises:
   a second arcuate track generally coaxial with the first arcuate track, the second arcuate track having a contact surface; and
   a third roller having an external surface, the external surface of the third roller being in contact only with the contact surface of the second arcuate track.

9. The system of claim 1 wherein the arcuate track includes a first arcuate track, and wherein the system further comprises:
   a second arcuate track generally coaxial with the first arcuate track, the second arcuate track having a contact surface;
   a third roller having an external surface, the external surface of the third roller being in contact only with the contact surface of the second arcuate track;
   a shaft carrying the first and third rollers; and
   a spherical bearing carried by the shaft.

10. The system of claim 1, further comprising:
    the fuselage;
    a wing depending from the fuselage; and
    a propulsion system depending from at least one of the fuselage and the wing.

11. The system of claim 1 wherein the roller arrangement further includes a third roller spaced apart from the first roller around the arcuate track, the third roller having an external surface in load bearing contact only with the contact surface of the arcuate track.

12. A canard assembly for an aircraft, comprising:
    an airfoil portion configured to be positioned external to an aircraft fuselage;
    a connecting portion configured to rotatably connect the airfoil portion to the fuselage; and
    a roller arrangement positioned to be coupled between the connecting portion and the fuselage, the roller arrangement including:
       a roller support coupleable to one of the fuselage and the connecting portion;
       an arcuate track coupleable to the other of the fuselage and the connecting portion, the arcuate track having an arcuate contact surface and a web portion disposed inwardly from the contact surface;
    a plurality of radial rollers rotatably carried by the roller support, each of the radial rollers having an external surface in load bearing contact only with the contact surface of the arcuate track; and a plurality of thrust rollers rotatably carried by the roller support, each of the thrust rollers having an external surface in load bearing contact only with the web portion of the accurate track.

13. The assembly of claim 12 wherein each of the radial rollers is rotatable about a first axis and each of the thrust rollers is rotatable about a second axis, the first axes being at least generally orthogonal to the second axes.

14. The assembly of claim 12 wherein each of the radial rollers is rotatable about a first axis and each of the thrust rollers is rotatable about a second axis, the first axes being at least generally orthogonal to the second axes, and wherein the connecting portion is rotatable about a third axis generally parallel to the first axis, and wherein the roller support includes a bracket having a first pin carrying at least one of the radial rollers in contact with the contact surface, and a second pin carrying at least one of the thrust rollers in contact with the web portion of the arcuate track, and wherein a load applied to the at least one radial roller in a direction generally parallel to the second axis increases a force applied by the at least one thrust roller to the web portion.

15. The assembly of claim 12 wherein the web portion includes a first surface facing a first direction and a second surface facing a second direction opposite the first direction, and wherein at least one of the thrust rollers engages the first surface and at least one of the thrust rollers engages the second surface.

16. The assembly of claim 12 wherein the roller support includes a bracket having a first pin carrying at least one of the radial rollers and a second pin carrying at least one of the thrust rollers, and wherein the first pin and the at least one radial roller is removable from the bracket without disengaging the at least one thrust roller from contact with the web portion.

17. The assembly of claim 12 wherein the web portion includes a first surface facing a first direction and a second surface facing a second direction opposite the first direction, and wherein the roller support includes a bracket having a first bracket portion and a second bracket portion, the first bracket portion carrying at least a first one of the thrust rollers in contact with the first surface of the of the web portion, the second bracket portion carrying at least a second one of the thrust rollers in contact with the second surface of the web portion, the first bracket portion being removable from the roller arrangement independently of the second bracket portion.

18. An apparatus, comprising:

a first structure;

a second structure positioned at least proximate to the first structure, the second structure being rotatable relative to the first structure about a rotation axis; and a roller arrangement coupled between the first and second structures, the roller arrangement including:

a roller support coupled to one of the first and second structures, the roller support having a first portion and a second portion;

an arcuate track coupled to the other of the first and second structures;

a first roller rotatably carried by the first portion of the roller support and having a generally smooth, uniform first external surface, the first external surface of the first roller being in load bearing contact only with the contact surface of the arcuate track, the first roller being positioned to roll along the contact surface;

a second roller rotatably carried by the second portion of the roller support and having a generally smooth, uniform second external surface, the second external surface of the second roller being in load bearing contact only with the contact surface of the arcuate track, the second roller being positioned to roll along the contact surface, the first and second rollers together restricting motion of the second structure relative to the first structure in opposing directions along a normal to the rotation axis.

19. The apparatus of claim 18, further comprising a third roller carried by the roller support and having a third external surface in load bearing contact only with the contact surface of the arcuate track.

20. The apparatus of claim 18 wherein the first portion of the roller support includes a first bracket and wherein the second portion of the roller support includes a second bracket.

21. The apparatus of claim 18 wherein the first portion of the roller support includes a first bracket and wherein the second portion of the roller support includes a second bracket, the first bracket being removable from the roller arrangement independent of the second bracket.

22. The apparatus of claim 18 wherein the arcuate track includes a flange portion having the contact surface, and a web portion disposed inwardly from the flange portion.

23. The apparatus of claim 18 wherein the arcuate track includes a flange portion having the contact surface, and a web portion disposed inwardly from the flange portion, the web portion being generally normal to the flange portion, and wherein the first roller is rotatable about a first axis and the second roller is rotatable about a second axis generally parallel to the first axis, and wherein the roller arrangement further includes a third roller having an external surface in contact with the web portion, the third roller being rotatable about a third axis generally normal to the first and second axes, the first, second and third rollers restricting motion of the second structure relative to the arcuate track in directions generally normal to the first and second axes while allowing the second structure to rotate relative to the arcuate track.

24. The apparatus of claim 18 wherein the arcuate track includes a flange portion having the contact surface, and a web portion disposed inwardly from the flange portion, the web portion being generally normal to the flange portion and having a first surface and a second surface facing opposite from the first surface, and wherein the first portion of the roller support includes a bracket having a first bracket portion and a second bracket portion removably coupled to the first bracket portion, further wherein the first roller is positioned between the first and second bracket portions of the roller support and is rotatable about a first axis, and wherein the roller arrangement further includes:

a third roller having an external surface in contact with the first surface of the web portion, the third roller being rotatable about a second axis generally normal to the first axis, the third roller being carried by the first bracket portion of the roller support; and a fourth roller having an external surface in contact with the second surface of the web portion, the fourth roller being rotatable about a third axis generally normal to the first axis and generally parallel to the second axis, the fourth roller being carried by the second bracket portion of the roller support, the second bracket portion of the roller support being removable from the first bracket portion of the roller support to allow access the fourth roller.

25. The apparatus of claim 18 wherein the arcuate track has an arcuate extent of less than 360 degrees.

26. The apparatus of claim 18 wherein the arcuate track has an arcuate extent of 360 degrees.

27. The apparatus of claim 18 wherein the contact surface of the arcuate track faces outwardly away from the rotation axis.

28. The apparatus of claim 18 wherein the contact surface of the arcuate track faces inwardly toward the rotation axis.

29. The apparatus of claim 18 wherein the arcuate track includes a first arcuate track, and wherein the system further comprises:
- a second arcuate track generally coaxial with the first arcuate track, the second arcuate track having a contact surface; and
- third and fourth rollers each having an external surface in load bearing contact only with the contact surface of the second arcuate track.

30. An aircraft system, comprising:
- an airfoil portion configured to be positioned external to an aircraft fuselage;
- a connecting portion configured to rotatably connect the airfoil portion to the fuselage; and
- a roller arrangement positioned to be coupled between the connecting portion and the fuselage, the roller arrangement including:
  - a roller support coupleable to one of the fuselage and the connecting portion;
  - an arcuate track coupleable to the other of the fuselage and the connecting portion, the arcuate track having a first contact surface;
  - a second contact surface positioned generally normal to the first contact surface;
  - a first roller rotatably carried by the roller support and having an external surface, the external surface of the first roller being in load bearing contact only with the contact surface of the arcuate track; and
  - a second roller rotatably carried by the roller support and having an external surface, the external surface of the second roller being in load bearing contact only with the second contact surface.

31. The system of claim 30 wherein the arcuate track includes a flange portion having the first contact surface, and a web portion disposed inwardly from the flange portion, the web portion having the second contact surface.

32. The system of claim 30 wherein the airfoil portion includes a canard.

* * * * *

UNITED STATES PATENT AND TRADEMARK OFFICE
CERTIFICATE OF CORRECTION

PATENT NO. : 6,843,450 B2
DATED : January 18, 2005
INVENTOR(S) : David L. Bath et al.

It is certified that error appears in the above-identified patent and that said Letters Patent is hereby corrected as shown below:

Column 13,
Line 6, "accurate" should read -- arcuate --;

Signed and Sealed this

Nineteenth Day of April, 2005

JON W. DUDAS
*Director of the United States Patent and Trademark Office*